United States Patent
Dang et al.

(10) Patent No.: US 11,712,780 B2
(45) Date of Patent: Aug. 1, 2023

(54) DUST COLLECTING TREATMENT APPARATUS

(71) Applicant: DISCO CORPORATION, Tokyo (JP)

(72) Inventors: Van Tuan Dang, Tokyo (JP); Miki Yoshida, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 559 days.

(21) Appl. No.: 17/038,923

(22) Filed: Sep. 30, 2020

(65) Prior Publication Data

US 2021/0101254 A1    Apr. 8, 2021

(30) Foreign Application Priority Data

Oct. 4, 2019  (JP) ................... 2019-183604

(51) Int. Cl.
*B24B 55/06* (2006.01)
*B01D 46/72* (2022.01)

(52) U.S. Cl.
CPC ............. *B24B 55/06* (2013.01); *B01D 46/72* (2022.01)

(58) Field of Classification Search
CPC ......... B24B 55/06; B24B 47/20; B24B 37/10; B24B 37/34; B01D 46/72; B01D 46/79; B01D 46/88; B01D 46/2411; B01D 46/64; B01D 46/681; B01D 50/20; A47L 9/10

USPC ............. 451/456, 87, 88, 285, 287; 95/281; 55/282–305, 522–528
See application file for complete search history.

(56) References Cited

U.S. PATENT DOCUMENTS

2019/0047116 A1*  2/2019  Kakefuda ............... B24B 41/02

FOREIGN PATENT DOCUMENTS

| JP | 2004001118 A | * | 1/2004 |
| JP | 2004001118 A |   | 1/2004 |
| JP | 2010125416 A | * | 6/2010 |

* cited by examiner

*Primary Examiner* — Joel D Crandall
*Assistant Examiner* — Michael A Gump
(74) *Attorney, Agent, or Firm* — Greer Burns & Crain Ltd.

(57) ABSTRACT

A dust collecting treatment apparatus is connected to a dry type polishing apparatus, sucks dust-containing air from the dry type polishing apparatus, and separates the dust and the air from each other. The apparatus includes a cylindrical main body connected to the dry type polishing apparatus; a suction box disposed on an upper plate of the cylindrical main body, a suction source connected to the suction box through a ventilating duct, a filter unit that includes a flange section supported on the upper plate of the cylindrical main body, a pipe formed integrally with the flange section and formed of a plurality of minute holes, and a filter formed of a water-soluble material and externally fitted to the pipe in a detachable manner. The filter is disposed inside the cylindrical main body. A water jet nozzle is disposed inside the suction box and jets water into the filter unit.

1 Claim, 3 Drawing Sheets

DUST COLLECTING TREATMENT APPARATUS

BACKGROUND OF THE INVENTION

Field of the Invention

The present invention relates to a dust collecting treatment apparatus.

Description of the Related Art

After a workpiece is ground by use of grindstone, the grinding surface is polished by use of a polishing pad to remove a rugged pattern on the grinding surface. As the polishing, there are chemical mechanical polishing (CMP) polishing in which polishing is conducted using a polishing liquid, and dry polishing.

In the dry polishing, polishing is conducted by bringing the polishing pad into contact with the workpiece, and therefore, dust including a powder of the polishing pad and a powder of the workpiece is generated. In order to remove such dusts from a processing chamber, a dust collecting treatment apparatus such as the one disclosed in Japanese Patent Laid-open No. 2004-001118 is added to the polishing apparatus.

The dust collecting treatment apparatus is provided therein with a tubular filter, and dust collection is performed by capturing the dust by the filter. When dust adheres to the filter, a dust collecting performance is lowered, and therefore, the filter is replaced periodically.

SUMMARY OF THE INVENTION

There is a problem that at the time of drawing the filter out of the dust collecting treatment apparatus in replacement of the filter, dust is scattered to the surroundings, to pollute the inside of a room in which the polishing apparatus and the dust collecting treatment apparatus are installed.

Accordingly, it is an object of the present invention to provide a dust collecting treatment apparatus capable of preventing pollution of the inside of a room in which a polishing apparatus and the dust collecting treatment apparatus are installed, at the time of replacing a filter unit.

In accordance with an aspect of the present invention, there is provided a dust collecting treatment apparatus connected to a dry type polishing apparatus, sucking dust-containing air from the dry type polishing apparatus, and separating the dust and the air from each other, the dust collecting treatment apparatus including: a cylindrical main body including a cylindrical side plate having an inlet for the air sucked in from the dry type polishing apparatus, an upper plate connected to an upper portion of the cylindrical side plate, and a drain receiving section connected to a lower portion of the cylindrical side plate and having a drain opening; a suction box disposed on the upper plate of the cylindrical main body; a suction source connected to the suction box through a ventilating duct; a drain box that stores drain water dripping through the drain opening of the drain receiving section; a filter unit that includes a flange section supported on the upper plate of the cylindrical main body, a pipe formed integrally with the flange section and formed of a plurality of minute holes, and a filter formed of a water-soluble material and externally fitted to the pipe in a detachable manner, and that is disposed inside the cylindrical main body; and a water jet nozzle that is disposed inside the suction box and that jets water into the filter unit, in which at the time of replacing the filter unit, water is jetted from the water jet nozzle into the inside of the filter unit, to dissolve the filter by water, and the filter unit including only the flange section and the pipe can be drawn out of the cylindrical main body.

According to the dust collecting treatment apparatus of the present invention, the filter is dissolved by running water, and therefore, the dust adhering to a side surface of the filter can be discharged through a discharge port together with the filter. As a result, the room in which the polishing apparatus and the dust collecting treatment apparatus are installed can be prevented from being polluted at the time of replacement of a filter unit.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

1 Polishing Apparatus

Figure 1:
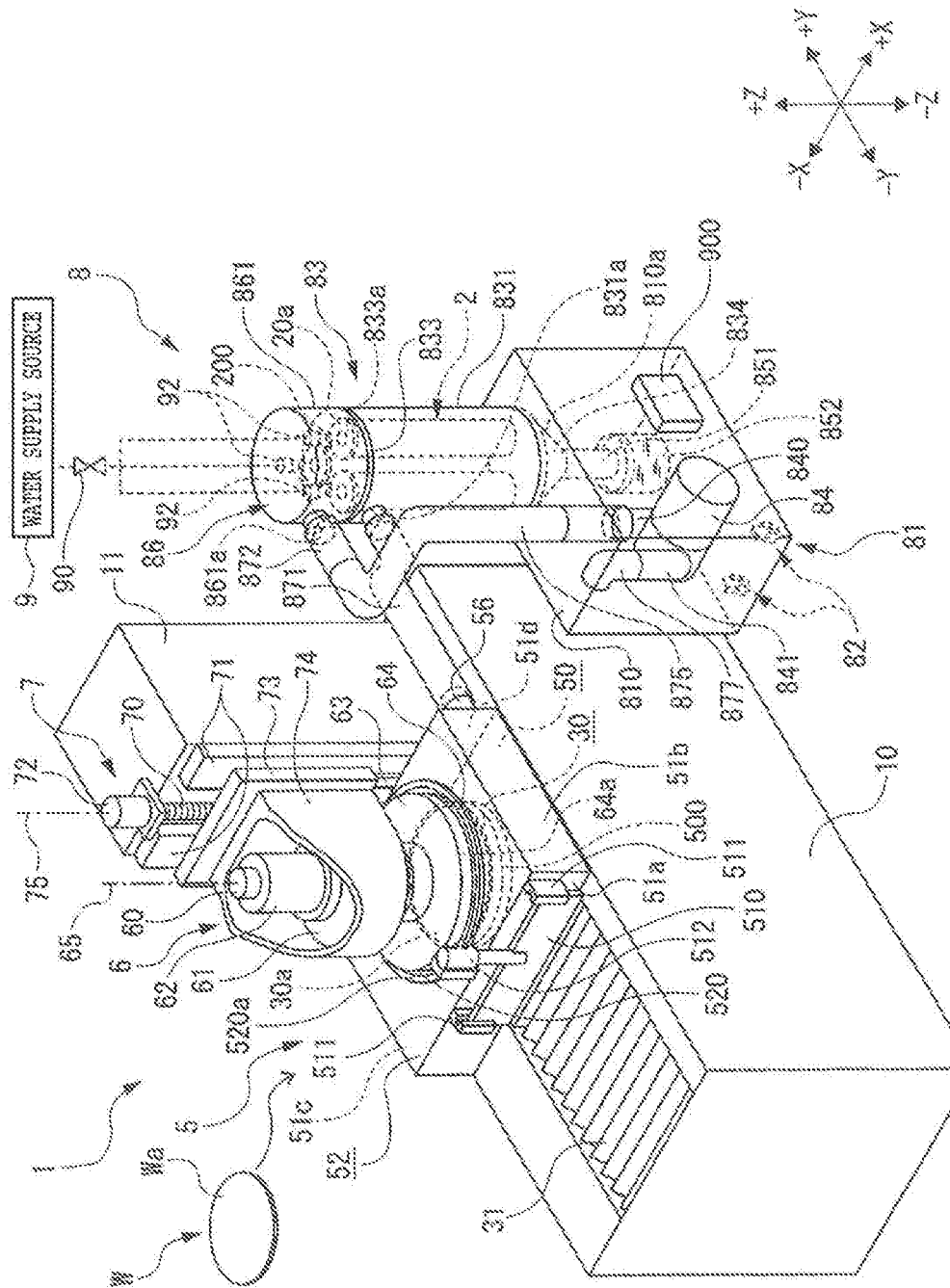
FIG. 1 is a perspective view depicting the whole body of a polishing apparatus including a dust collecting treatment apparatus.

A polishing apparatus 1 illustrated in FIG. 1 is a dry type polishing apparatus for polishing a workpiece W. The polishing apparatus 1 will be described below. As illustrated in FIG. 1, the polishing apparatus 1 includes a base 10 extended in a Y-axis direction, and a column 1 erected on a +Y direction side of the base 10.

The polishing apparatus 1 includes a holding table 30. The holding table 30 is disk-shaped, and its upper surface is a holding surface 30a on which the workpiece W is held. The holding table 30 is connected to suction means which is not illustrated. With a suction force generated by use of the suction means or the like in a state in which the workpiece W is placed on the holding surface 30a, the thus generated suction force is transmitted to the holding surface 30a, and the workpiece W can be suction held on the holding surface 30a.

A horizontal moving mechanism, which is not illustrated, is disposed under the holding table 30. The holding table 30 can be moved in a Y-axis direction by the horizontal moving mechanism. In addition, a bellows 31 is disposed on the base 10. With the holding table 30 moved in the Y-axis direction, the bellows 31 is contracted or expanded. The holding table 30 is connected to rotating means, not illustrated, and can be rotated with a rotational axis 35 in a Z-axis direction passing through the center of the holding table 30 as an axis.

A polishing feeding mechanism 7 that performs polishing feeding of a polishing unit 6 in the Z-axis direction is disposed on a side surface on the −Y direction side of the column 11. The polishing feeding mechanism 7 includes a ball screw 70 having a rotational axis 75 in the Z-axis direction, a pair of guide rails 71 disposed in parallel to the ball screw 70, a motor 72 that rotates the ball screw 70 with the rotational axis 75 as an axis, a lift plate 73 a nut inside of which is screw engaged with the ball screw 70 and a side portion of which makes sliding contact with the guide rails 71, and a holder 74 connected to the lift plate 73 and holding the polishing unit 6.

When the ball screw 70 is rotated around the rotational axis 75 by use of the motor 72, the lift plate 73 is lifted up or down in the Z-axis direction while being guided by the guide rails 71, and the polishing unit 6 supported by the holder 74 is lifted up or down in the Z-axis direction.

The polishing unit 6 includes a spindle 60 having a rotational axis 65 in the Z-axis direction, a housing 61 that supports the spindle 60 in a rotatable manner, a motor 62 that rotates the spindle 60 with the rotational axis as an axis, a disk-shaped mount 63 connected to a lower end of the spindle 60, and a disk-shaped polishing pad 64 attached to a lower surface of the mount 63 in a detachable manner.

The polishing pad 64 has, for example, a nonwoven fabric such as felt or a material such as urethane, and contains abrasive grains of an appropriate size. For example, the diameter of the polishing pad 64 is larger than the diameter of the workpiece W, and at the time of polishing, a polishing surface 64a of the polishing pad 64 makes contact with the whole area of a work surface Wa of the workpiece W.

A rectangular parallelepiped processing chamber 5 is disposed under the polishing unit 6 and on the base 10. The processing chamber 5 includes a bottom plate 50, side walls 51a to 51d connected to the outer periphery of the bottom plate 50 and erected in the Z-axis direction, and a top plate 52 facing the bottom plate 50 and connected to upper ends of the side walls 51a to 51d. The bottom plate 50 is formed in a substantially central portion thereof with a circular opening 500 having a diameter slightly larger than the diameter of the holding table 30, and the holding table 30 projects from the opening 500.

The side wall 51a on the −Y direction side has a conveying-in/out port (not illustrated) formed by cutting out in a substantially rectangular shape, for example. In addition, a shutter 510 for opening/closing the conveying-in/out port by moving up or down in the Z-axis direction and guide rails 511 for guiding the upward/downward movement of the shutter 510 are disposed on the side wall 51a, and the shutter 510 can be moved up or down by shutter moving means 512 such as an air cylinder.

For example, by moving the holding table 30 in the Y-axis direction by use of a horizontal moving mechanism (not illustrated) in a state in which the shutter 510 is moved up and the conveying-in/out port is open, the holding table 30 can be moved into the inside of the processing chamber 5 or moved to the outside of the processing chamber 5. The processing chamber 5 is a chamber in which polishing of the workpiece W is carried out. The side wall 51d on the +Y direction side is formed with a vent port 56.

The top plate 52 is formed in a substantially central portion thereof with a circular second opening 520 slightly larger in diameter than the mount 63 and the polishing pad 64, and a sealing member 520a is disposed in the periphery of the second opening 520. When the polishing unit 6 is lowered in the −Z direction by being driven by the polishing feeding mechanism 7, the polishing pad 64 is accommodated into the inside of the processing chamber 5. In a state in which the polishing pad 64 is accommodated inside the processing chamber 5, the second opening 520 is hermetically closed with the mount 63 and the sealing member 520a.

At the time of polishing the workpiece W by use of the polishing apparatus 1, first, the workpiece W is placed on the holding surface 30a of the holding table 30 with its work surface Wa on an upper side, and the suction means (not illustrated) is operated to suction hold the workpiece W on the holding surface 30a.

Then, the shutter 510 is moved in the +Z direction by use of the shutter moving means 512, to open the shutter 510, and the holding table 30 is moved in the +Y direction by use of the Y-axis direction moving means (not illustrated). As a result, the holding table 30 and the workpiece W held on the holding surface 30a of the holding table 30 are accommodated into the inside of the processing chamber 5 and are positioned under the polishing pad 64.

Thereafter, the shutter 510 is moved in the −Z direction by use of the shutter moving means 512, to close the shutter 510. Next, the holding table 30 is rotated with the rotational axis 35 as an axis by use of the rotating means which is not illustrated. Further, the spindle 60 is rotated with the rotational axis 65 as an axis by use of the motor 62. As a result, the mount 63 connected to the spindle 60 and the polishing pad 64 mounted to the mount 63 are rotated with the rotational axis 65 as an axis.

In the state in which the workpiece W is rotated with the rotational axis 35 as an axis and the polishing pad 64 is rotated with the rotational axis 65 as an axis, the polishing pad 64 is lowered in the −Z direction by use of the polishing feeding mechanism 7. As a result, the polishing surface 64a of the polishing pad 64 is brought into contact with the work surface Wa of the workpiece W, and the workpiece W is polished. When the workpiece W is polished by the polishing pad 64, polishing swarf is generated.

In this instance, since the polishing pad 64 is accommodated inside the processing chamber 5 and the second opening 520 is hermetically closed with the mount 63 and the sealing member 520a, the polishing swarf and the like generated by polishing can be prevented from scattering through the second opening 520 to the outside of the processing chamber 5.

2 Dust Collecting Treatment Apparatus

The above-described polishing apparatus 1 is connected to a dust collecting treatment apparatus 8 that collects polishing swarf and the like generated by polishing of the workpiece W. The dust collecting treatment apparatus 8 will be described below. The dust collecting treatment apparatus 8 includes a rectangular parallelepiped apparatus housing 81. An upper surface 810 of the apparatus housing 81 is formed with a circular opening 810a. Various component parts and the like possessed by the dust collecting treatment apparatus 8 are disposed in the inside space of the apparatus housing 81 and on the apparatus housing 81. Casters 82 for facilitating movement of the apparatus housing 81 are mounted to a lower surface of the apparatus housing 81.

The dust collecting treatment apparatus 8 includes a main body 83. The main body 83 is a main body part of cyclone type separating means, for example, and has a function of separating dust and air from each other. The main body 83 has a hollow cylindrical shape, and the material thereof is, for example, a metallic material such as stainless steel.

The main body 83 includes an outer cylinder 831. The diameter of the outer cylinder 831 corresponds to the diameter of the circular opening 810a formed in the upper surface 810 of the apparatus housing 81. The outer cylinder 831 is disposed on the apparatus housing 81, for example, in a state in which the opening 810a in the upper surface 810 of the apparatus housing 81 and a bottom surface of the outer cylinder 831 coincide with each other, and there is no gap present between the upper surface 810 and the outer cylinder 831.

The outer cylinder 831 is formed with an inlet 831*a* through which air enters, and a vent pipe 871 is connected to the inlet 831*a*. That end portion of the vent pipe 871 which is not connected to the inlet 831*a* is connected to the vent port 56 formed in the side wall 51*d* on the +Y direction side of the processing chamber 5.

The main body 83 includes an upper plate 833. The upper plate 833 has a disk-like shape corresponding to the upper surface of the outer cylinder 831. The upper plate 833 is formed with a plurality of (in FIG. 1, three) upper openings 833*a*. For example, a cylindrical suction box 86 having a diameter substantially equivalent to the diameter of the upper plate 833 of the main body 83 is disposed on the upper plate 833, such as to cover the upper side of the upper plate 833.

A side plate 861 of the suction box 86 is formed with an outlet 861*a*, and a connection pipe 872 is connected to the outlet 861*a*. The connection pipe 872 is connected to a suction duct 875, and the suction duct 875 is connected to a suction piping 840. In addition, the suction piping 840 is connected to a suction source 84. In other words, the suction box 86 communicates with the suction source 84 through the connection pipe 872, the suction duct 875, and the suction piping 840.

An exhaust pipe 841 is connected to the suction source 84, and an exhaust duct 877 is connected to that side of the exhaust pipe 841 which is not connected to the suction source 84. An end portion of the exhaust duct 877 on the side not connected to the exhaust pipe 841 is an exhaust port 877*a*. Note that the suction source 84, the suction piping 840, and the exhaust pipe 841 are disposed in the inside of the apparatus housing 81.

The suction source 84 has, for example, a suction motor or the like (not illustrated). By operating the suction source 84, air inside the processing chamber 5 can be sucked through the suction box 86 and the main body 83, and the sucked air can be discharged through the exhaust port 877*a* of the exhaust duct 877 to the outside space of the dust collecting treatment apparatus 8.

A plurality of (in FIG. 3, three) water jet nozzles 92 is disposed inside the suction box 86. The water jet nozzles 92 are disposed on the upper openings 833*a* of the upper plate 833, with their jet port directed in the −Z direction, for example. In addition, the water jet nozzles 92 are connected to a water supply source 9 through a valve 90. Besides, a valve control section 900 for controlling the open/closed state of the valve 90 is disposed, for example, at a side surface of the apparatus housing 81. By opening the valve 90 by use of the valve control section 900 and supplying water from the water supply source 9, water can be jetted from the water jet nozzles 92 toward the upper openings 833*a* of the upper plate 833.

Figure 2:
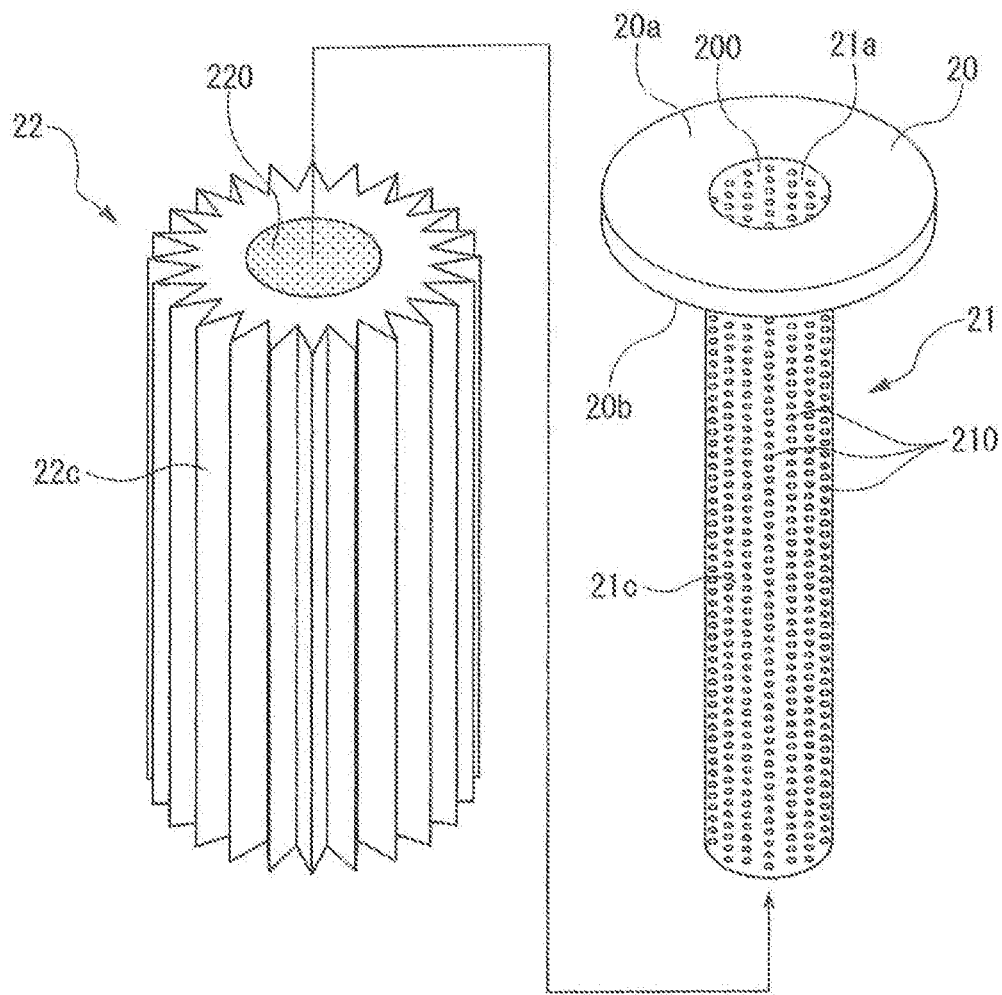
FIG. 2 is an exploded perspective view of a filter unit.
Figure 2:
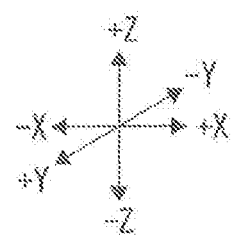

For example, a number corresponding to the number of the upper openings 833*a* of (in FIG. 1, three) filter units 2 are detachably disposed in the inside of the main body 83. As depicted in FIG. 2, the filter unit 2 includes an annular flange section 20. An opening 200 is formed substantially in the center of the flange section 20.

The filter unit 2 includes a pipe 21. A side surface 21*c* of the pipe 21 is formed with a multiplicity of minute holes 210. The pipe 21 droops from the flange section 20, and the flange section 20 and the pipe 21 are integral with each other.

Figure 3:
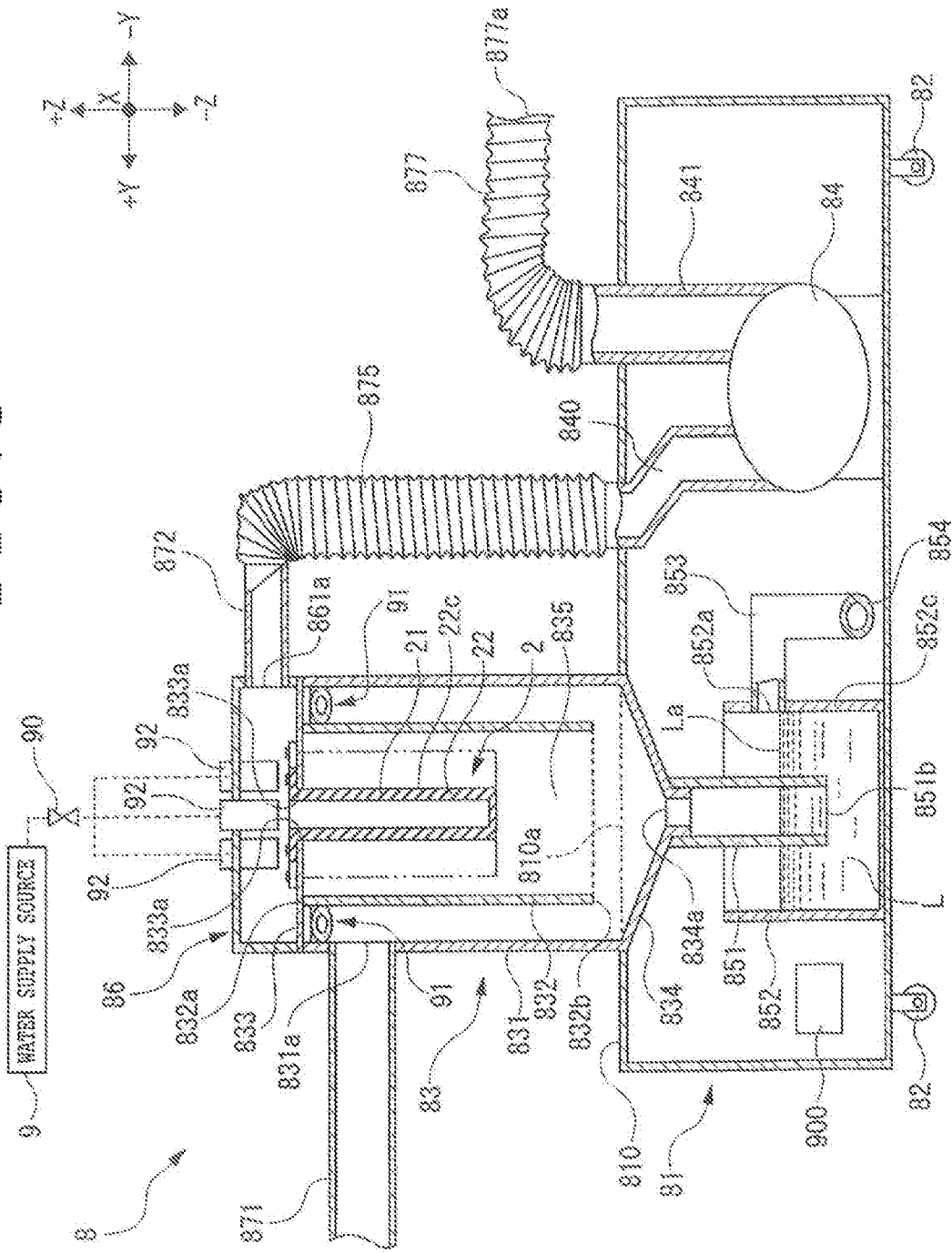
FIG. 3 is a vertical sectional view of the dust collecting treatment apparatus.

The filter unit 2 includes a filter 22 of a cloth or porous material including a water-soluble material such as PVA. The filter 22 is a bellows-like tube, and the pipe 21 is inserted and fixed in a cylindrical cavity 220 formed substantially in the center of the filter 22, resulting in a state in which the filter 22 is externally wound around the side surface 21*c* of the pipe 21. As depicted in FIG. 3, the filter unit 2 is extended through the upper openings 833*a* into the inside of the main body 83, and the flange section 20 is supported by the upper plate 833.

An inner cylinder 832 is disposed between the main body 83 and the filter unit 2. The inner cylinder 832 has its upper end 832*a* connected and fixed to a lower surface side of the upper plate 833 and is supported by the upper plate 833. The outer cylinder 831 and the inner cylinder 832 share a center axis 835 in the Z-axis direction, and the length of the inner cylinder 832 is shorter than the length of the outer cylinder 831.

For example, shower nozzles 91 are disposed at an upper portion of a region between the outer cylinder 831 and the inner cylinder 832, and the shower nozzles 91 are connected to the water supply source 9. Water supplied from the water supply source 9 is jetted from the shower nozzles 91 and caused to impinge on an outside surface of the inner cylinder 832 and an inside surface of the outer cylinder 831 of the main body 83, whereby dust adhering to the outside surface of the inner cylinder 832 and the inside surface of the outer cylinder 831 of the main body 83 can be washed away.

Note that the inner cylinder 832 may not be disposed inside the main body 83. In the case where the inner cylinder 832 is not disposed inside the main body 83, the shower nozzles 91 may not be disposed at an upper portion of the inside of the main body 83.

A funnel-like drain receiving section 834 is provided at a lower portion of the main body 83. The drain receiving section 834 is connected to a lower end of the outer cylinder 831 and is disposed inside the apparatus housing 81. The drain receiving section 834 is formed with a drain opening 834*a*, and a drain pipe 851 is connected thereto such as to droop from the drain opening 834*a*.

A tub-like drain box 852 is disposed under the drain pipe 851 such that the height position of a lower end 851*b* of the drain pipe 851 is lower than the height position of an upper end of a side surface 852*c* of the drain box 852. The drain pipe 851 and the drain box 852 are disposed inside the apparatus housing 81. Water L is stored in the drain box 852 such that the height position of the water surface La is higher than the height position of the lower end 851*b* of the drain pipe 851, and the lower end 851*b* of the drain pipe 851 is water sealed by the water surface La.

A side surface 852*c* of the drain box 852 is formed with a side opening 852*a*, and an overflow pipe 853 permitting overflow of water L stored inside the drain box 852 is connected to the side opening 852*a*.

An end portion of the overflow pipe 853 on the side not connected to the side opening 852*a* is connected to a drain port 854. The water L flowing over from the drain box 852 passes through the overflow pipe 853, to be drained through the drain port 854 to the exterior.

At the time of collecting the dust in the inside of the processing chamber 5 depicted in FIG. 1 by use of the dust collecting treatment apparatus 8, the suction source 84 is operated to produce a suction force. By the suction force produced by the suction source 84, dust-containing air inside the processing chamber 5 flows out through the vent port 56, passes through the vent pipe 871, and flows into the inside of the main body 83 through the inlet 831*a* formed in the outer cylinder 831 of the main body 83.

The dust-containing air flowing into the inside of the main body 83 through the inlet 831*a* is slewed inside the main body 83 with the center axis 835 as an axis, and goes spirally downward between the inner cylinder 832 and the outer cylinder 831 depicted in FIG. 3, for example. The dust-containing air reaching the lower end 832b of the inner cylinder 832 flows into the inside of the inner cylinder 832 through the lower end 832b of the inner cylinder 832, whereon it goes spirally upward inside the inner cylinder 832 with the center axis 835 as an axis.

In this instance, the dust-containing air is caused by a centrifugal force to impinge, for example, on an inside surface of the outer cylinder 831, or an inside surface or an outside surface of the inner cylinder 832. As a result, the dust looses a momentum in the slewing direction, falls into the drain receiving section 834, flows out to the exterior of the main body 83 through the drain opening 834a formed at the drain receiving section 834, and passes through the inside of the drain pipe 851, to be stored in the drain box 852.

In addition, the dust-containing air having flowed into the inside of the inner cylinder 832 makes contact with an outside surface 22c of the filter 22. As a result, the dust is captured by the filter 22, the air penetrates the filter 22 and flows into the inside of the filter 22, whereby the dust and the air are separated from each other.

The air separated from the dust flows into the inside of the pipe 21 through the minute holes 210 of the pipe 21 depicted in FIG. 2, goes upward through the inside space of the pipe 21, and flows out into the inside of the suction box 86 depicted in FIG. 1 through the opening 200 of the flange section 20.

Then, the air is sucked by the suction source 84 through the outlet 861a formed in the side plate 861 of the suction box 86 and through the connection pipe 872, the suction duct 875, and the suction piping 840, and is discharged to the outside space of the dust collecting treatment apparatus 8 through the exhaust pipe 841 and through the exhaust port 877a of the exhaust duct 877.

By collecting the dust inside the processing chamber 5 by use of the dust collecting treatment apparatus 8 as above-mentioned, the dust adheres to the filter 22, and the dust collecting function of the dust collecting treatment apparatus 8 is gradually lost. Therefore, the filter 22 of the filter unit 2 needs replacement.

At the time of replacing the filter 22, first, the valve control section 900 is opened by use of the valve control section 900 depicted in FIG. 1, water is supplied from the water supply source 9 to the water jet nozzles 92, and the water is jetted from the water jet nozzles 92 into the inside of the filter unit 2. The water jetted from the water jet nozzles 92 flows into the pipe 21 depicted in FIG. 2 through the opening 200 at the flange section 20, and flows out to the outside of the pipe 21 through the multiplicity of minute holes 210 formed in the side surface 21c of the pipe 21.

When the water flows out to the outside of the pipe 21, the water makes contact with the filter 22 externally wound around the pipe 21, and the filter 22 is dissolved in the water. An aqueous solution containing the filter 22 dissolved gradually falls in the −Z direction, and is stored in the drain box 852 through the drain receiving section 834 and the drain pipe 851.

In addition, for example, the drain pipe 851 is provided with a drain valve (not illustrated), and after closing the drain valve, water is jetted from the water jet nozzles 92, to store water inside the main body 83. By this, the filter 22 may be immersed in and dissolved in the water inside the main body 83, and the drain valve may be opened, to discharge the water into the drain box 852.

When the filter 22 externally wound around the pipe is entirely dissolved in water, the filter unit 2 includes only the flange section 20 and the pipe 21. The flange section 20 of the filter unit 2 having come to include only the flange section 20 and the pipe 21 is gripped, and is drawn out from the main body 83 in the +Z direction, whereby the filter unit 2 can be drawn out of the main body 83.

Thereafter, a new filter unit 2 is inserted through the upper opening 833a. As a result, the flange section 20 is supported by the upper plate 833, and the new filter unit 2 is mounted to the main body 83.

Note that for delaying the replacing time for the filter unit 2, the water jet nozzles 92 may be provided with a function of jetting only air, and air may be periodically jetted from the water jet nozzle 92, to blow off the dust adhering to the outside surface of the filter unit 2. In addition, the dust collecting treatment apparatus 8 may recognize the replacing time for the filter by measuring a negative pressure inside the connection pipe 872 by a pressure gauge disposed at the outlet 861a, for example.

In this way, the filter 22 formed of a water-soluble material such as PVA is dissolved by water, whereby the dust adhering to the filter 22 can be prevented from scattering at the time of replacing the filter 22, and a room in which the polishing apparatus 1 and the dust collecting treatment apparatus 8 are installed can be prevented from being polluted.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A dust collecting treatment apparatus for connecting to a dry type polishing apparatus, for sucking dust-containing air from the dry type polishing apparatus, and for separating the dust and the air from each other, the dust collecting treatment apparatus comprising:
    a cylindrical main body including a cylindrical side plate having an inlet for the air sucked in from the dry type polishing apparatus, an upper plate connected to an upper portion of the cylindrical side plate, and a drain receiving section connected to a lower portion of the cylindrical side plate and having a drain opening;
    a suction box disposed on the upper plate of the cylindrical main body;
    a suction source connected to the suction box through a ventilating duct;
    a drain box that stores drain water dripping through the drain opening of the drain receiving section;
    a filter unit that includes a flange section supported on the upper plate of the cylindrical main body, a pipe formed integrally with the flange section and formed of a plurality of minute holes, and a filter formed of a water-soluble material and externally fitted now reads "to the pipe in a detachable manner, wherein the filter unit is disposed inside the cylindrical main body; and
    a water jet nozzle that is disposed inside the suction box and that jets water into the filter unit, wherein
    at the time of replacing the filter unit, water is jetted from the water jet nozzle into the inside of the filter unit, to dissolve the filter by water, and the filter unit including only the flange section and the pipe is drawn out of the cylindrical main body.

* * * * *